United States Patent
Shashidhar et al.

(10) Patent No.: US 12,481,545 B2
(45) Date of Patent: Nov. 25, 2025

(54) DETECTION AND RECOVERY OF PLATFORM SPECIFIC REPLICATION FAILURES IN SDNAS SOLUTION ON A STORAGE SYSTEM

(71) Applicant: Dell Products L.P., Round Rock, TX (US)

(72) Inventors: Rashmi Shashidhar, Bangalore (IN); Kumaravel Palanisamy, Bangalore (IN); Likith Prasanna P, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 127 days.

(21) Appl. No.: 18/467,076

(22) Filed: Sep. 14, 2023

(65) Prior Publication Data

US 2025/0094284 A1 Mar. 20, 2025

(51) Int. Cl.
*G06F 11/07* (2006.01)
*G06F 11/14* (2006.01)

(52) U.S. Cl.
CPC ...... *G06F 11/0727* (2013.01); *G06F 11/0706* (2013.01); *G06F 11/1402* (2013.01); *G06F 2201/805* (2013.01)

(58) Field of Classification Search
CPC .. G06F 11/07; G06F 11/0706; G06F 11/0712; G06F 11/0727; G06F 11/201; G06F 11/2017; G06F 11/2053–2097; G06F 11/1402
See application file for complete search history.

(56) References Cited

U.S. PATENT DOCUMENTS

| | | | |
|---|---|---|---|
| 10,795,786 B1 * | 10/2020 | Potnis | G06F 3/065 |
| 2009/0240975 A1 * | 9/2009 | Shitomi | H04L 69/40 |
| | | | 711/E12.002 |

* cited by examiner

*Primary Examiner* — Michael Maskulinski
(74) *Attorney, Agent, or Firm* — DALY, CROWLEY, MOFFORD & DURKEE, LLP

(57) ABSTRACT

An example methodology includes monitoring a replication workflow execution on a storage system and, responsive to a detection of a failure of the replication workflow, determining whether the failure is in a Software Defined Network Attached Storage (SDNAS) or in an underlying storage array platform. The method also includes, responsive to a determination that the failure is in the SDNAS, validating health of the SDNAS for performing the replication workflow and, responsive to validating the health of the SDNAS, performing recovery of the failed replication workflow. The method further includes, responsive to a determination that the failure is in the underlying storage array platform, determining that the underlying storage array platform can be rolled back to a previously known good state for performing the replication workflow, performing a rollback of the underlying storage array platform to the previously known good state, and performing the recovery of the failed replication workflow.

18 Claims, 5 Drawing Sheets

DETECTION AND RECOVERY OF PLATFORM SPECIFIC REPLICATION FAILURES IN SDNAS SOLUTION ON A STORAGE SYSTEM

BACKGROUND

A storage system may include a plurality of storage devices (e.g., storage arrays) to provide data storage to a plurality of nodes. The plurality of storage devices and the plurality of nodes may be situated in the same physical location, or in other remote locations. The plurality of nodes may be coupled to the storage devices by a high-speed interconnect, such as a switch fabric.

Distributed storage systems, along with other types of distributed computing systems, may be hosted within cloud computing environments and/or on-premises data centers. A distributed computing system can include various types of hardware and software components. Hardware components can include physical and/or virtual machines, storage devices, networking hardware, etc. Software components can include virtualization software, operating systems (OSs), services, middlewares, applications, etc., configured to run on and utilize physical/virtual hardware.

A storage system may provide Software Defined Network Attached Storage (SDNAS) which abstracts the system's storage arrays. For example, the SDNAS may be integrated with the base storage system platform which provides the storage array network (SAN) solution to provide clients feature rich network attached storage (NAS) functionality.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

In accordance with one illustrative embodiment provided to illustrate the broader concepts, systems, and techniques described herein, a method includes, by a computing device, monitoring a replication workflow execution on a storage system and, responsive to a detection of a failure of the replication workflow, determining whether the failure is in a Software Defined Network Attached Storage (SDNAS) or in an underlying storage array platform. The method also includes, by the computing device, responsive to a determination that the failure is in the SDNAS, validating a health of the SDNAS for performing the replication workflow and, responsive to validating the health of the SDNAS, performing recovery of the failed replication workflow.

In some embodiments, the validating a health of the SDNAS for performing the replication workflow includes checking one or more components of the SDNAS which are needed to perform the replication workflow.

In some embodiments, the method also includes, responsive to failing to validate the health of the SDNAS for performing the replication workflow, reporting an original error associated with the failure of the replication workflow in the SDNAS.

In some embodiments, performing recovery of the failed replication workflow includes attempting forward execution of the replication workflow from a failed replication operation in the replication workflow.

In some embodiments, the method also includes reporting a result of the recovery of the failed replication workflow.

In some embodiments, determining whether the failure is in the underlying storage array platform includes determining whether the failure is in a data replication facility of the underlying storage array platform.

In some embodiments, the method also includes, by the computing device, responsive to a determination that the failure is in the underlying storage array platform, determining whether the underlying storage array platform can be rolled back to a previously known good state for performing the replication workflow. The method further includes, responsive to a determination that the underlying storage array platform can be rolled back to the previously known good state, performing a rollback of the underlying storage array platform to the previously known good state and performing the recovery of the failed replication workflow.

In some embodiments, the determining whether the underlying storage array platform can be rolled back to the previously known good state includes determining whether a data replication facility of the underlying storage array platform is available.

In some embodiments, the method further includes, responsive to the determination that the failure is in the underlying storage array platform, responsive to a determination that the replication workflow is an unplanned failover, performing the recovery of the failed replication workflow without the rollback of the underlying storage array platform to the previously known good state.

In some embodiments, the method further includes, responsive to a determination that the underlying storage array platform cannot be rolled back to the previously known good state, reporting an original error associated with the failure of the replication workflow in the underlying storage array platform.

In some embodiments, performing the recovery of the failed replication workflow responsive to the determination that the underlying storage array platform can be rolled back to the previously known good state includes retrying the failed replication workflow. In some embodiments, the method also includes reporting a result of the retrying of the failed replication workflow.

According to another illustrative embodiment provided to illustrate the broader concepts described herein, a computing device includes one or more non-transitory machine-readable mediums configured to store instructions and one or more processors configured to execute the instructions stored on the one or more non-transitory machine-readable mediums. Execution of the instructions causes the one or more processors to carry out a process including monitoring a replication workflow execution on a storage system and, responsive to a detection of a failure of the replication workflow, determining whether the failure is in a Software Defined Network Attached Storage (SDNAS) or in an underlying storage array platform. The process also includes, responsive to a determination that the failure is in the SDNAS, validating a health of the SDNAS for performing the replication workflow and, responsive to validating the health of the SDNAS, performing recovery of the failed replication workflow. In some embodiments, the process further includes, responsive to a determination that the failure is in the underlying storage array platform, determining whether the underlying storage array platform can be rolled back to a previously known good state for performing the replication workflow and, responsive to a determination that the underlying storage array platform can be rolled back to the previously known good state, performing a rollback of the underlying storage array platform to the previously known good state and performing the recovery of the failed replication workflow.

According to another illustrative embodiment provided to illustrate the broader concepts described herein, a non-transitory machine-readable medium encodes instructions that when executed by one or more processors cause a process to be carried out, the process including a replication workflow execution on a storage system and, responsive to a detection of a failure of the replication workflow, determining whether the failure is in a Software Defined Network Attached Storage (SDNAS) or in an underlying storage array platform. The process also includes, responsive to a determination that the failure is in the SDNAS, validating a health of the SDNAS for performing the replication workflow and, responsive to validating the health of the SDNAS, performing recovery of the failed replication workflow. In some embodiments, the process further includes, responsive to a determination that the failure is in the underlying storage array platform, determining whether the underlying storage array platform can be rolled back to a previously known good state for performing the replication workflow and, responsive to a determination that the underlying storage array platform can be rolled back to the previously known good state, performing a rollback of the underlying storage array platform to the previously known good state and performing the recovery of the failed replication workflow.

It should be appreciated that individual elements of different embodiments described herein may be combined to form other embodiments not specifically set forth above. Various elements, which are described in the context of a single embodiment, may also be provided separately or in any suitable sub-combination. It should also be appreciated that other embodiments not specifically described herein are also within the scope of the claims appended hereto.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

Figure 1:
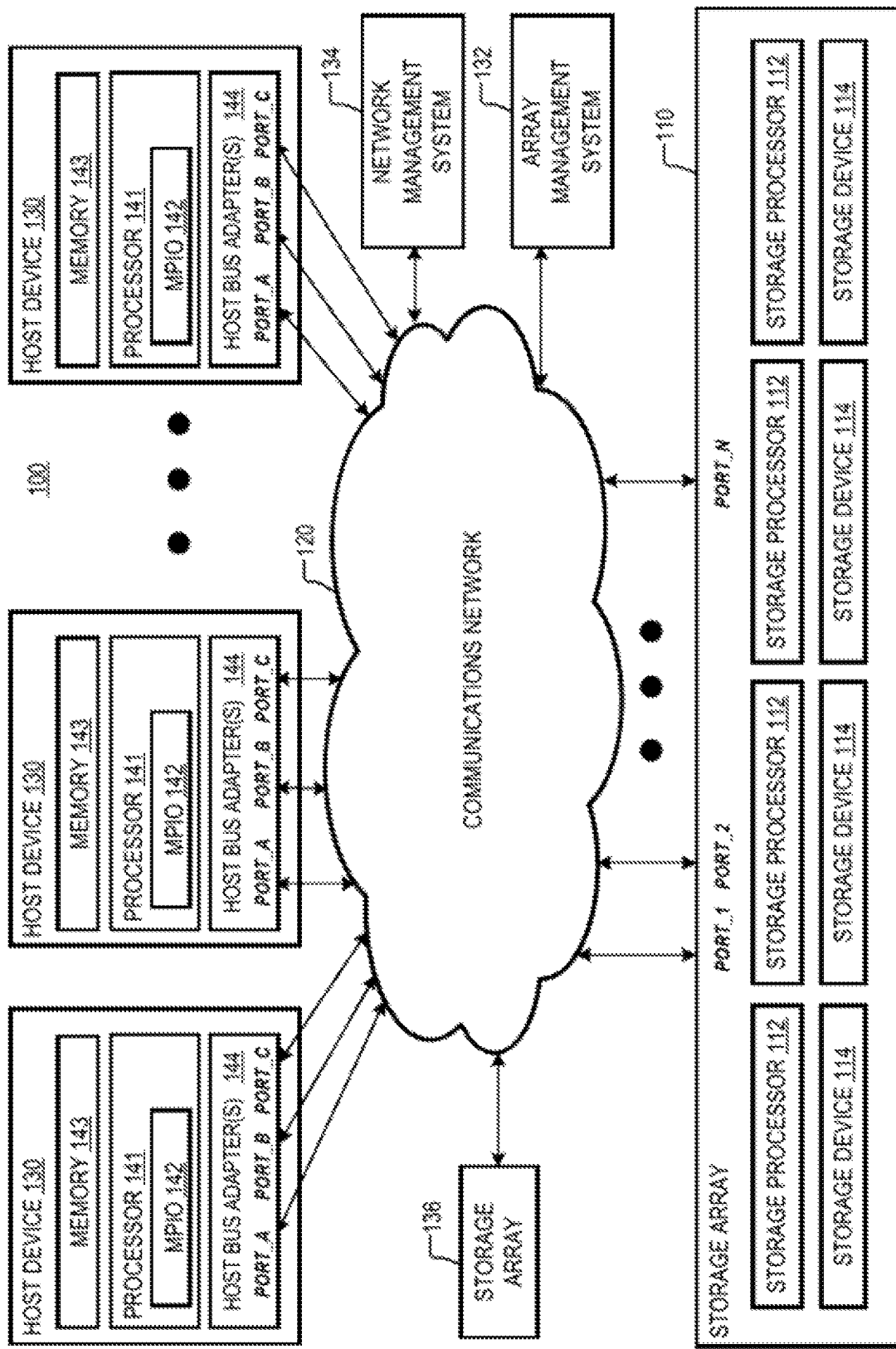
FIG. 1 is a block diagram of an illustrative storage system within which embodiments of the present disclosure may be utilized.

SDNAS platforms may be configured to enable various replication modes using the data replication facilities of the underlying storage arrays. Data replication is the process of making multiple copies of data and storing the data at different locations for various purposes. Data replication is essential to data protection and recovery. Data replication for storage arrays may take place in several ways. For example, two or more storage arrays may synchronously replicate data between the arrays. Synchronous replication is a process where distinct copies of the data (e.g., dataset) are maintained by multiple storage arrays. For example, data is replicated to a secondary storage array at the same time as new data is being created or updated in the primary storage array. In synchronous replication, all accesses (e.g., reads) of the data yield consistent results regardless of which storage array the access is directed to. As another example, two or more storage arrays may asynchronously replicate data between the arrays. Asynchronous replication is a store-and-forward approach to replication where the data is stored in the memory and transferred in cycles based on a Recovery Point Objective (RPO). In any case, the underlying storage array or storage system can utilize a data replication facility, such as, for example, the Symmetrix Remote Data Facility (SRDF) provided by Dell EMC and/or another data replication technology, to provide the data replication functionality.

In many SDNAS platforms, the SDNAS implementation may be platform agnostic, meaning that the SDNAS is implemented to be integrated with various different underlying platforms. As a platform agnostic implementation, the SDNAS is not aware of and/or does not understand many of the underlying platform's states and errors. Taking data replication as an example, there may be differences in how the SDNAS and the data replication facility of the storage array represent the various states and errors of the underlying platform. For example, the SDNAS may use "Partial-Failedover" to represent a failure in an SDNAS replication session. In contrast, the data replication facility (e.g., the SRDF) may use "suspended" to represent a state of the underlying platform resulting from a failure in an SDNAS replication session. So, when the underlying data replication facility returns "suspended" to indicate a failure in an SDNAS replication session, the SDNAS may use "failed" to report the "suspended" state of the underlying platform resulting from the failure of the SDNAS replication has no knowledge of the reported "suspended" state (e.g., since the SDNAS does not understand the meaning of "suspended"). As a result of the disconnect between the state management between the SDNAS and the data replication facility provided by the underlying platform, resuming failed replication operations, such as failover, may be difficult, if not impossible, without escalation to technical support or other support personnel having specialized knowledge of the SDNAS platform. For example, a customer using the SDNAS to perform a replication workflow will not understand the reason for the reported "failed" state. In other words, from the reported "failed" state, the customer will not be able to determine that the underlying platform (e.g., the data replication facility) entered into the "suspended" state. As a result, the customer will need to contact customer support to resolve the failure. Having to escalate failed replication workflows results in an application(s) being hosted on the SDNAS experiencing prolonged data unavailability (DU) as well as degradation of system performance, which may negatively impact customer experience and satisfaction. The customer is also inconvenienced with having to escalate to recover from the failure, which may further negatively impact customer experience/satisfaction with the SDNAS hosted platform.

Disclosed herein are concepts, structures, and techniques for detection and recovery of platform specific replication failures. In some embodiments, a replication workflow can be monitored by an SDNAS middleware to detect replication workflow failures. Upon detecting a failure of a replication workflow, a determination can be made as to whether the detected failure is in the SDNAS or in the underlying storage array platform, e.g., in the data replication facility of the underlying storage array. If the failure is in the SDNAS, predetermined checks of the SDNAS can be performed to validate the health of the SDNAS for performing the replication workflow. For example, the various components of the SDNAS which are needed to perform the replication workflow can be checked to determine that they are in the proper states for performing the replication workflow. Upon validating the health of the SDNAS, recovery of the failed replication workflow can be performed (e.g., forward execution of the replication workflow from the detected failure, e.g., the failed replication operation in the replication workflow, can be attempted). For example, execution of the failed replication operation in the replication workflow can be retried. If the failure is in the underlying storage array platform (e.g., the failure is in the data replication facility), predetermined checks of the underlying storage array platform can be performed to determine whether the components of the underlying storage array platform are in the proper states for putting the underlying storage array platform in condition for performing the replication workflow. For example, various components of the underlying storage array platform can be checked to determine whether the underlying platform can be rolled back to a previously known good state for performing the replication workflow. Upon determining that the components of the underlying storage array platform are in the proper states, the underlying storage array platform can be rolled back to a previously known good state, and recovery of the failed replication workflow can be performed. In either case, the result of the recovery of the failed replication workflow can be reported, for example, to an end user (e.g., reported to a user who is performing the replication workflow). Also, if the check of the SDNAS and/or the check of the underlying storage array platform fail, the original error associated with the detected failure of the replication workflow can be reported to the user. Numerous configurations and variations will be apparent in light of this disclosure.

FIG. 1 is a diagram of an example of a storage system 100 within which embodiments of the present disclosure may be utilized. As illustrated, system 100 may include a storage array 110, a communications network 120, a plurality of host devices 130, an array management system 132, a network management system 134, and a storage array 136.

Storage array 110 may include a plurality of storage processors 112 and a plurality of storage devices 114. Each of the storage processors 112 may include a computing device that is configured to receive I/O requests from any of the host devices 130 and execute the received I/O requests by reading or writing data to storage devices 114. In some implementations, each of the storage processors 112 may have an architecture that is the same or similar to the architecture of a computing device 500 of FIG. 5. Storage processors 112 may be located in the same geographic location or in different geographic locations. Similarly, storage devices 114 may be located in the same geographic location or different geographic locations. Each of the storage devices 114 may include any of a solid-state drive (SSD), a non-volatile random-access memory (nvRAM) device, a non-volatile memory express (NVME) device, a hard disk (HD), and/or any other suitable type of storage device. In some implementations, storage devices 114 may be arranged in one or more Redundant Array(s) of Independent Disks (RAID) arrays. Communications network 120 may include one or more of the Internet, a local area network (LAN), a wide area network (WAN), a fibre channel (FC) network, and/or any other suitable type of network.

Each of the host devices 130 may include a laptop, a desktop computer, a smartphone, a tablet, an Internet-of-Things device, and/or any other suitable type of electronic device that is configured to retrieve and store data in storage arrays 110 and 136. Each host device 130 may include a memory 143, a processor 141, and one or more host bus adapters (HBAs) 144. Memory 143 may include any suitable type of volatile and/or non-volatile memory, such as a solid-state drive (SSD), a hard disk (HD), a random-access memory (RAM), a Synchronous Dynamic Random-Access Memory (SDRAM), etc. Processor 141 may include any suitable type of processing circuitry, such as a general-purpose process (e.g., an x86 processor, a MIPS processor, an ARM processor, etc.), a special-purpose processor, an application-specific integrated circuit (ASIC), a field programmable gate array (FPGA), etc. Each of the HBAs 144 may be a circuit board or integrated circuit adapter that connects a respective one of the host devices 130 to storage array 110 (and/or storage array 136). In other words, each of the HBAs 144 may include a communications interface for connecting to communications network 120, storage array 110, and/or storage array 136. Although in the example of FIG. 1 each of the host devices 130 is provided with at least one HBA 144, alternative implementations are possible in which each of the host devices is provided with another type of communications interface, in addition to (or instead of) an HBA. The other type of communications interface may include one or more of an Ethernet adapter, a WiFi adapter, a local area network (LAN) adapter, etc.

Each processor 141 may be configured to execute a multi-path I/O (MPIO) driver 142. MPIO driver 142 may comprise, for example, PowerPath™ drivers from Dell EMC™, and/or other types of MPIO drivers that are arranged to discover available communications paths with any of the host devices 130 and the storage array 110. MPIO driver 142 may be configured to select I/O operations from any of the I/O queues of host devices 130. The sources of the I/O operations stored in the I/O queues may include respective processes of one or more applications executing on host devices 130.

HBA 144 of each of the host devices 130 may include one or more ports. Specifically, in the example of FIG. 1, HBA 144 of each of the host devices 130 includes three ports, which are herein enumerated as "port A", "port B", and "port C". Furthermore, storage array 110 may also include a plurality of ports. In the example of FIG. 1, the ports in storage array 110 are enumerated as "port 1", "port 2," and "port N", where N is a positive integer greater than 2. Each of the ports in host devices 130 may be coupled to one of the ports of the storage array via a corresponding network path. The corresponding network path may include one or more hops in communications network 120. Under the nomenclature of the present disclosure, a network path spanning between an HBA port of one of host devices 130 and one of the ports of the storage array 110 is referred to as a "network path of that host device 130".

Figure 5:
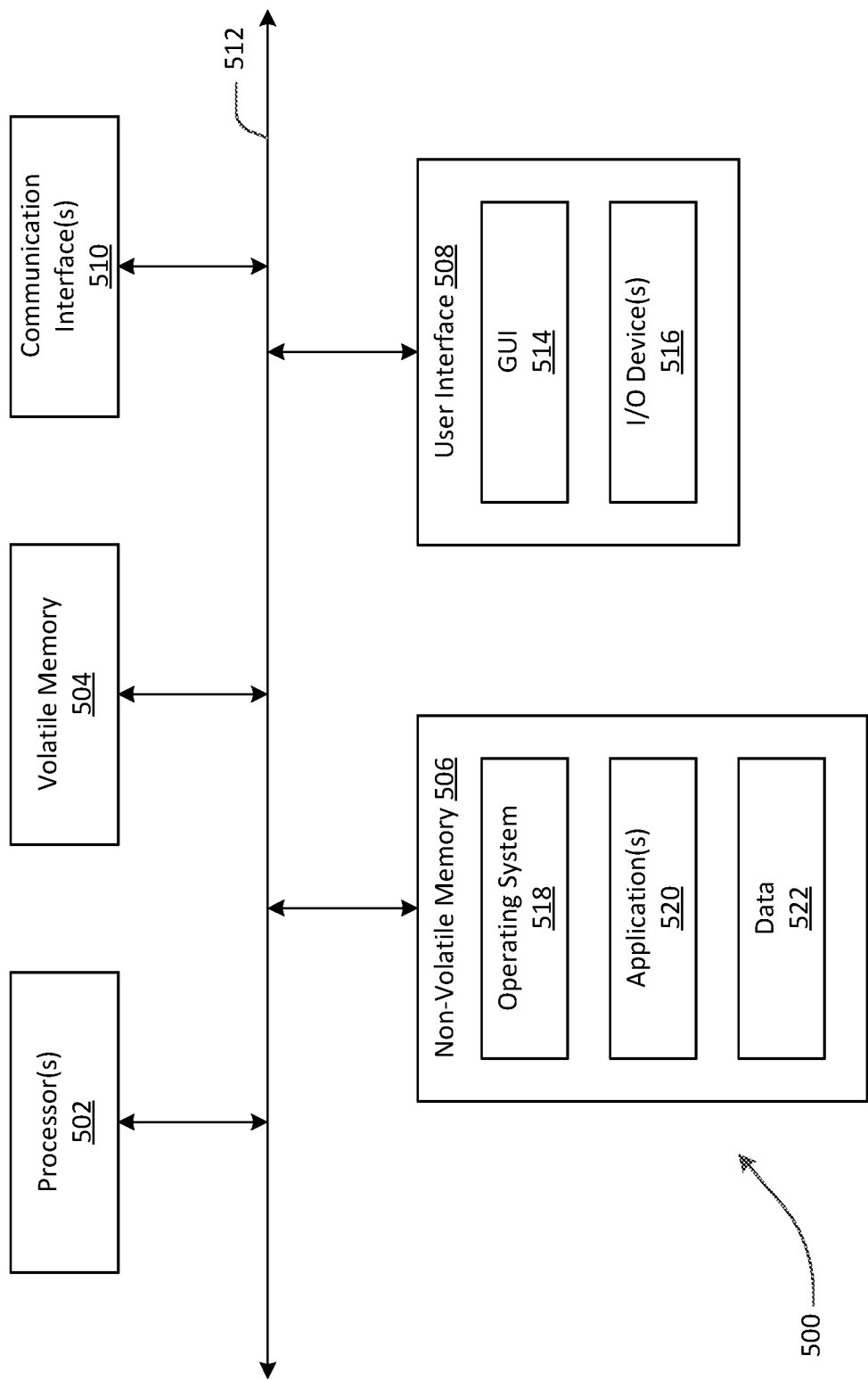
FIG. 5 is a block diagram illustrating selective components of an example computing device in which various aspects of the disclosure may be implemented, in accordance with an embodiment of the present disclosure.

Array management system 132 may include a computing device, such as computing device 500 of FIG. 5. Array management system 132 may be used by a system administrator to re-configure storage array 110, e.g., when degraded performance of storage array 110 is detected.

Network management system 134 may include a computing device, such as computing device 500 of FIG. 5. Network management system 134 may be used by a network administrator to configure communications network 120 when degraded performance of communications network 120 is detected.

Storage array 136 may be the same or similar to storage array 110. Storage array 136 may be configured to store the same data as storage array 110. Storage array 136 may be configured to operate in either active-active configuration with storage array 110 or in active-passive configuration. When storage arrays 110 and 136 operate in active-active configuration, a write request to either of storage arrays 110 and 136 is not acknowledged back to the sender until the data associated with the write request is written to both of the storage arrays 110 and 136. When storage arrays 110 and 136 are operated in active-passive configuration, a write request to a given one of the storage arrays 110 and 136 is acknowledge for as long the data associated with write request is written to the given one of the storage arrays 110 and 136 before the writing to the other one of the storage arrays is completed.

Figure 2:
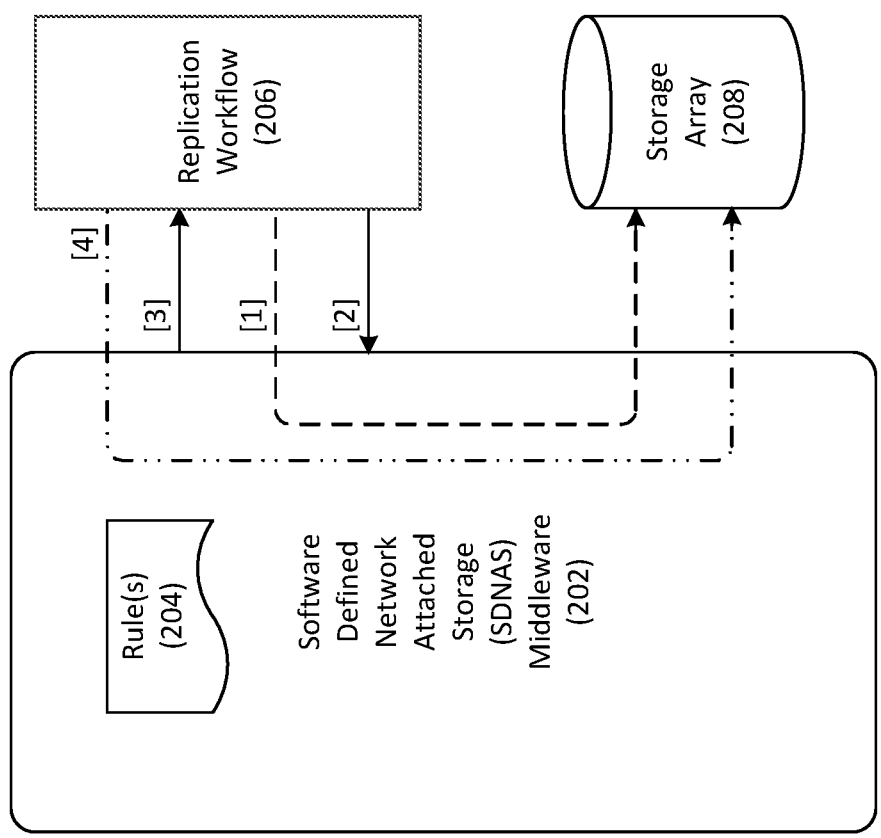
FIG. 2 is a schematic illustration of an example replication failure detection and recovery topology that can be used to recover platform specific replication failures, in accordance with an embodiment of the present disclosure.

Referring now to FIG. 2, shown is a schematic illustration of an example replication failure detection and recovery topology that can be used to recover platform specific replication failures, in accordance with an embodiment of the present disclosure. Such a topology can be understood as a process in which an SDNAS middleware 202 leverages one or more replication recovery rules 204 to recover platform specific replication failures. In embodiments, SDNAS middleware 202 may correspond to software that abstracts the network accessible physical storage resources of a storage system (e.g., NAS solution deployed on the storage system). That is, SDNAS middleware 202 can be understood as abstracting the SDNAS and the platform specific functionalities. In such embodiments, SDNAS middleware 202 may provide an application programming interface (API), such as, for example, a representational state transfer (REST)-based API, for file integration. For example, relating FIG. 2 to FIG. 1, SDNAS middleware 202 running on storage system 100 may abstract storage array 110. SDNAS middleware 202 may, in some embodiments, be hosted on a physical and/or virtual machine or processing device within the storage system (e.g., run on a guest operating system on storage system 100 of FIG. 1).

As mentioned previously, SDNAS middleware 202 can leverage one or more replication recovery rules 204 to recover replication failures. Replication recovery rules 204 (sometimes referred to herein as "rules 204" or more simply as "rules") can define recovery operations based on the underlying platform state and the error. Thus, rules 204 can be understood to be platform specific. In some embodiments, a user, such as a subject matter expert, having knowledge of the underlying platform, data replication, and the various replication errors that may arise during execution of replication workflows may design rules 204 based on such knowledge. For example, for a particular replication error, one or more rules 204 created for the replication error may define recovery operations for recovering a replication workflow failure caused by the replication error. The recovery operations defined for a replication error may include operations to check the health and/or states of various components of the platform. For example, one or more of the recovery operations may be to check the health of various components of the SDNAS which are needed to perform recovery of the replication workflow (e.g., checks to determine that the various components of the SDNAS are in the proper or correct states for recovering the failed replication workflow). As another example, one or more of the recovery operations may specify checking various components of the underlying storage platform (e.g., the underlying platform's data replication facility) to determine whether these components are in proper states for putting the storage platform in condition for performing recovery of the replication workflow. Recovery operations defined for recovering replication workflow failures in the underlying storage platform may specify previously known good states of the storage platform for performing recovery of replication workflows and the operations to rollback the storage platform to the previously known good state. In general, rules 204 can define the recovery operations for recovering from failures of replication workflows and based on the type of failure, specify predetermined health checks and rollback operations which are to be performed before attempting recovery of failed replication workflows.

In the example of FIG. 2, SDNAS middleware 202 may be monitoring [1] a replication workflow 206 executing on the storage system for a failure. As used herein, the term "workflow" refers to a sequence of operations and/or actions, which may include execution of one or more applications, to accomplish a task. In the context of data replication, a replication workflow refers to a sequence of operations/actions to perform data replication. For example, replication workflow 206 may define replication operations to replicate data to a storage array 208 utilizing a data replication facility of storage array 208 (e.g., utilizing the underlying platform's data replication facility).

In the course of monitoring replication workflow 206, SDNAS middleware 202 may detect [2] a failure of replication workflow 206 (i.e., detect a failure during replication workflow 206). In response, according to one embodiment, SDNAS middleware 202 may analyze the failure and a cause for the failure. For example, SDNAS middleware 202 may analyze an error code and/or description of the error associated with the failure to classify the failure as occurring either in the SDNAS (e.g., in SDNAS middleware 202) or in the underlying platform (e.g., in the underlying storage array 208). That is, SDNAS middleware 202 may analyze the description of the error which caused replication workflow 206 to fail to determine whether the failure occurred in the SDNAS or the underlying platform.

SDNAS middleware 202 may then leverage rules 204 to determine the recovery operations to perform to recover the failed replication workflow 206. For example, if SDNAS middleware 202 determines that the failure is in the SDNAS, SDNAS middleware 202 can identify rules 204 that are applicable to the failure and, from the identified rules 204, determine the predetermined health checks that are to be performed. SDNAS middleware 202 can then perform checks of the components of the SDNAS specified in the identified rules 204 to determine whether the components are in the proper states for performing recovery of the failed replication workflow 206 (e.g., checks to determine whether the components are in condition for retrying execution of the failed replication workflow 206). If the result of the checks is that the components are in the proper states, SDNAS middleware 202 can perform recovery [3] of the failed replication workflow 206. For example, in one embodiment, SDNAS middleware 202 can retry execution of the replication operation that failed in replication workflow 206. SDNAS middleware 202 may then monitor [4] the recovery of replication workflow 206 for a failure. Upon completion of the recovery of replication workflow 206, SDNAS middleware 202 may return the results (e.g., successful completion or error condition) of the recovery of replication workflow 206 (e.g., return the results to a user performing replication workflow 206). If the result of the checks of the components of the SDNAS is that the components are not in the proper states, SDNAS middleware 202 can return the original failure (e.g., return an indication of the original error associated with the replication workflow failure to a user performing replication workflow 206). In this case, SDNAS middleware 202 does not attempt to recover the failed replication workflow 206 since the checks of the components of the SDNAS did not pass.

If SDNAS middleware 202 determines that the failure is in the underlying storage platform (e.g., in storage array 208), SDNAS middleware 202 can identify rules 204 that are applicable to the failure and, from the identified rules 204, determine the predetermined health checks that are to be performed. SDNAS middleware 202 can then perform checks of the components of the underlying storage platform specified in the identified rules 204 to determine whether the components are in the proper states for rolling back the storage platform to a previously known good state for performing recovery of the failed replication workflow 206 (e.g., perform checks of the data replication facility to determine whether the data replication facility is in condition for rolling back the storage platform to the known good state). If the result of the checks is that the components are in the proper states, SDNAS middleware 202 can roll back the storage platform to the previously known good state and, once the storage platform is rolled back, perform recovery [3] of the failed replication workflow 206. The previously known good state for the storage platform may be specified in the identified rules 204 that are applicable to the failure. In one embodiment, SDNAS middleware 202 can retry execution of the failed replication workflow 206. SDNAS middleware 202 may then monitor [4] the recovery of replication workflow 206 for a failure. Upon completion of the recovery of replication workflow 206, SDNAS middleware 202 may return the results (e.g., successful completion or error condition) of the recovery of replication workflow 206 (e.g., return the results to a user performing replication workflow 206). If the result of the checks of the components of the storage platform is that the components are not in the proper states for rolling back the storage platform, SDNAS middleware 202 can return the original failure (e.g., return an indication of the original error associated with the replication workflow failure to a user performing replication workflow 206). In this case, SDNAS middleware 202 does not attempt to recover the failed replication workflow 206 since the checks of the components of the storage platform did not pass.

Figure 3:
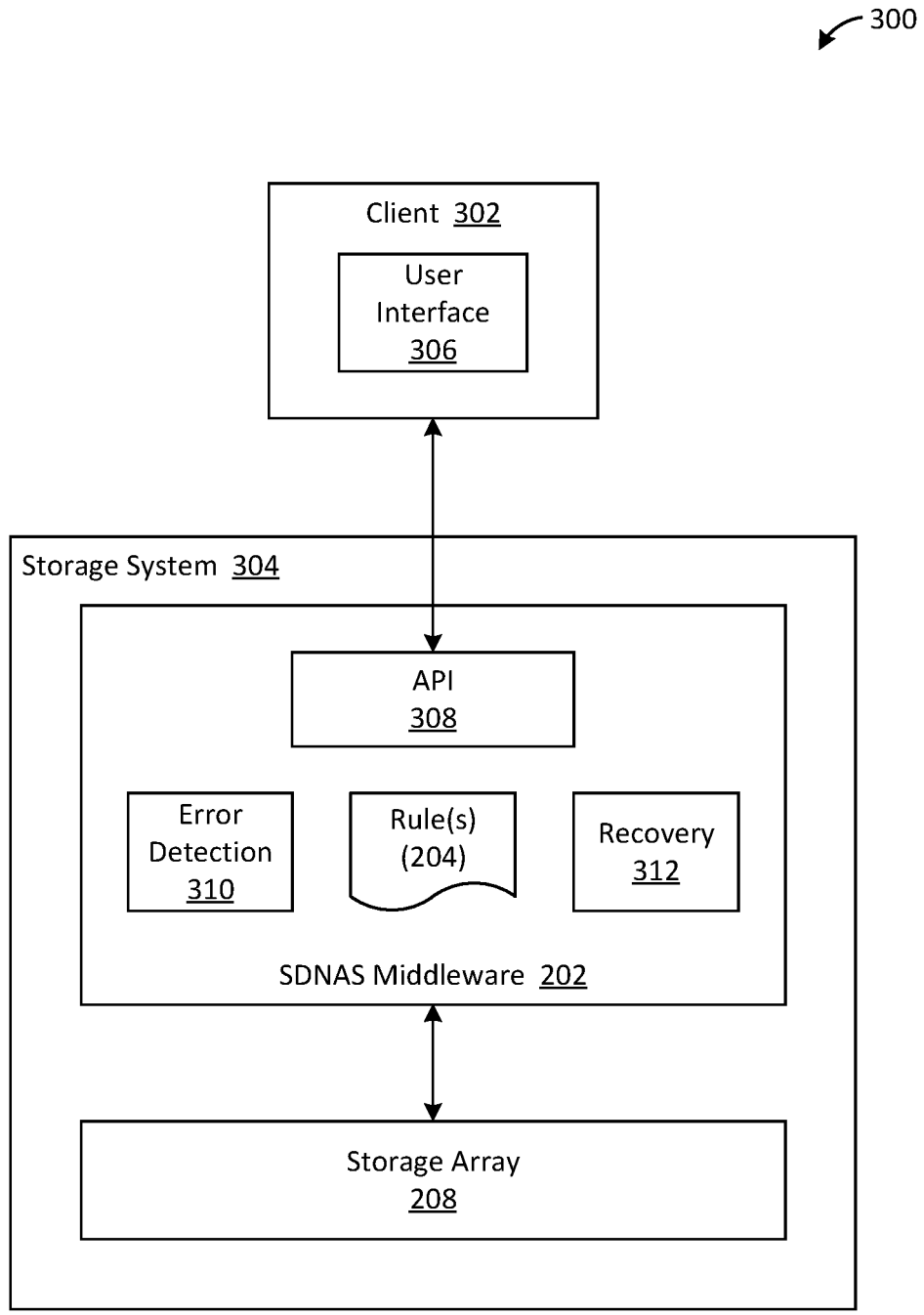
FIG. 3 is a block diagram of an illustrative system that provides detection and recovery of platform specific replication failures, in accordance with an embodiment of the present disclosure.

Referring now to FIG. 3, shown is a block diagram of an illustrative system 300 that provides detection and recovery of platform specific replication failures, in accordance with an embodiment of the present disclosure. In FIG. 3, elements of FIG. 2 are shown using like reference designators and, unless context dictates otherwise, may not be described again for purposes of clarity. Using the techniques and structures disclosed herein, SDNAS middleware 202 may monitor and detect failures in replication workflows. In response to detecting a failure during a replication workflow, SDNAS middleware 202 may determine whether the detected failure (i.e., the detected replication workflow failure) is in the SDNAS or the underlying storage platform. Based on the cause of the failure, i.e., whether the failure is in the SDNAS or the underlying storage platform, SDNAS middleware 202 may apply a recovery procedure that is appropriate for the failure without failing the replication workflow in the first instance. That is, SDNAS middleware 202 may automatically apply an appropriate recovery procedure to recover the replication workflow failure and not just return an indication of the failure without attempting a recovery of the failure. Illustrative system 300 includes a client 302 communicably coupled to a storage system 304 via one or more communication networks (not shown). The communication networks can include, for example, the Internet, LANs, WANs, FC networks, etc. Storage system 304 can be the same or similar to storage system 100 of FIG. 1. In some such cases, client 302 can be the same or similar to host device 130 of FIG. 1.

As shown in FIG. 3, client 302 includes a user interface (UI) module 306 and storage system 304 includes SDNAS middleware 202 and storage array 208. In some cases, client 302 may correspond to host device 130 of FIG. 1, storage system 304 may correspond to storage system 100 of FIG. 1, and storage array 208 may correspond to a storage array platform such as storage array 110 of FIG. 1. To promote clarity in the drawings, FIG. 3 shows a single client 302 communicably coupled to storage system 304. However, it will be appreciated that more than one client 302 may be communicably coupled to storage system 304.

Referring to client 302, UI module 306 is configured to provide a graphical user interface (GUI) and/or other suitable interface with which a user (e.g., a user of client 302) can access and interact with storage system 304. As used herein, the term "user" refers, in addition to its ordinary meaning, to a person or thing that uses something, either stated or implied. For example, a user can be any person, system, or other entity that uses a client (e.g., client 302) to access and interact with a storage system (e.g., storage system 304). A user may be a human or a non-human (e.g., an application or a system). For example, a user may use a GUI provided by UI module 306 on client 302 to initiate requests, such as replication command requests, on storage system 304. Examples of replication command requests include, for example, Create, Start, Switchover/Reverse (e.g., for load balancing), Failover (e.g., unplanned failover), Delete, and Update. For example, UI module 306 can provide UI elements/controls a user can use to specify and initiate a replication command request. UI module 306 can also provide a UI control that the user can use (e.g., that the user can click/tap) to request processing or execution of the replication command request by storage system 304. In response to the user's input, client 302 can send a message to storage system 304 that causes the processing of a replication workflow resulting from or corresponding to the replication command.

UI module 306 can also include UI controls that enable a user to view information related to the processing of requests initiated by the user. For example, in some embodiments, responsive to sending a replication command request, client 302 and, in particular, UI module 306 on client 302 may receive a response from storage system 304 which includes an indication of a result of the processing of a replication workflow corresponding to the replication command. For example, the response may indicate that the replication workflow is successfully performed. Conversely, the response may indicate that the replication workflow failed and include an indication of an error code and a description of the error.

Referring to storage system 304, SDNAS middleware 202 includes an application programming interface (API) module 308, an error detection module 310, a recovery module 312, and rules 204. As mentioned previously, in embodiments, SDNAS middleware 202 may abstract storage array 208 of network accessible storage resources (e.g., NAS) of storage system 304 to one or more clients 302.

API module 308 may provide an API, such as a representational state transfer (REST)-based API or other suitable API, with which applications and devices can connect to and communicate with SDNAS middleware 202. For example, UI module 306 can utilize API module 308 to send messages to initiate requests (e.g., replication command requests) to SDNAS middleware 202 wherein the messages are received and processed by SDNAS middleware 202 or one or more components of SDNAS middleware 202. Likewise, SDNAS middleware 202 or one or more components of SDNAS middleware 202 can utilize API module 308 to send responses/messages to UI module 306.

Error detection module 310 is operable to detect replication workflow failures. For example, error detection module 310 can monitor processing of replication workflows caused by replication command requests for failures during the replication workflows. In more detail, error detection module 310 can assign a job identifier (jobID) or other suitable identifier to each replication workflow launched through API module 308 to uniquely identify the replication workflows. Error detection module 310 can then persist the jobIDs, for example, in a database or other suitable data store, and use the jobIDs to monitor the replication workflows and track any failures during the replication workflows. In response to detecting a failure of a replication workflow, error detection module 310 can capture an error code and/or a description of the error which caused the replication workflow to fail (e.g., description of the error associated with the replication workflow failure). Error detection module 310 can then invoke recovery module 312 for recovery of the replication workflow failure. For example, error detection module 310 can send a message or other signal (e.g., inter-process communications signal) that causes recovery module 312 to attempt recovery of the failed replication workflow. In some embodiments, the message sent by error detection module 310 can include information about the replication workflow failure, such as the error code and description of the error, which recovery module 312 can use to classify the failure and attempt recovery of the failed replication workflow.

Recovery module 312 is operable to attempt recovery of failed replication workflows. To this end, recovery module 312 can leverage rules 204 to determine recovery operations to perform to recover failed replication workflows. For example, rules 204 may define recovery operations for recovering from failures of replication workflows based on the underlying platform state and the error. In more detail, in response to a message informing of a failure of a replication workflow, recovery module 312 can determine whether the failure is in the SDNAS or the underlying storage platform. That is, recovery module 312 can determine whether the failure occurred in the SDNAS (e.g., in SDNAS middleware 202) or occurred in the underlying storage platform (e.g., in storage array 208 being abstracted by SDNAS middleware 202). To determine whether the failure occurred in the SDNAS or the underlying storage platform, according to one embodiment, recovery module 312 can analyze the description of the error which caused the replication workflow to fail (e.g., analyze the information about the replication workflow failure sent or otherwise provided by error detection module 310). In some embodiments, for a particular failure of a replication workflow, recovery module 312 can perform predetermined checks depending on the type of failure (e.g., SDNAS failure or underlying storage platform failure) prior to attempting recovery of the failed replication workflow.

In response to a determination that the failure occurred in the SDNAS, recovery module 312 can check the health of components utilized in retrying the failed replication workflow. In more detail, recovery module 312 can identify rules 204 that are applicable to the failure (i.e., identify one or more rules 204 designed for addressing a replication error which caused the replication workflow failure) and, from the identified rules 204 determine the health checks that are to be performed. For example, a rule (e.g., one particular rule 204) designed for addressing a particular replication error in the SDNAS may define recovery operations to check the health of various components of the SDNAS such as network connections. As another example, a rule (e.g., one particular rule 204) designed for addressing another replication error in the SDNAS may define recovery operations to check the health of various components of the SDNAS such as a remote system utilized in the data replication. In any case, recovery module 312 can perform the recovery operations defined by the identified rules 204 applicable to the failure to validate the health of the components specified by the identified rules 204. Recovery module 312 can then attempt recovery of the failed replication workflow based on the result of the checks of the components specified by the identified rules 204 applicable to the failure. That is, recovery module 312 can attempt recovery of the failed replication workflow upon validating the health of the components specified by the identified rules 204 applicable to the failure. For example, if the result of the checks is that the components are in the proper states for performing recovery of the failed replication workflow, recovery module 312 can perform recovery of the failed replication workflow (e.g., retry execution of the replication operation that failed in the replication workflow). Otherwise, if the result of the checks is that the components are not in the proper states for performing recovery of the failed replication workflow, recovery module 312 does not attempt recovery of the failed replication workflow. Rather, recovery module 312 can return the original failure. For example, recovery module 312 can return an indication of the original error associated with the replication workflow failure to a user that initiated the replication command request that caused processing of the replication workflow that failed.

In response to a determination that the failure occurred in the underlying storage platform, recovery module 312 can check the health of components of the underlying storage platform to determine whether the components are in the proper states for rolling back the storage platform to a previously known good state. In more detail, recovery module 312 can identify rules 204 that are applicable to the failure (i.e., identify one or more rules 204 designed for addressing a replication error which caused the replication workflow failure) and, from the identified rules 204 determine the health checks that are to be performed. As noted above, the rules designed for addressing failures in the underlying storage platform may define recovery operations for checking to determine whether components are in the proper states for rolling back the storage platform to a previously known good state for performing recovery of the failed replication workflow. For example, a rule (e.g., one particular rule 204) designed for addressing a particular replication error in the underlying storage platform may define recovery operations to check the data replication facility to determine whether the data replication facility is in condition for rolling back the storage platform to a known good state. For example, a defined recovery operation may check the link status of the data replication facility connections (e.g., check the health of the connections of the data replication facility). The rules designed for addressing a particular replication error may specify the known good state of the storage platform for performing recovery of the replication workflow failure caused by the replication error. Recovery module 312 can perform the recovery operations defined by the identified rules 204 applicable to the failure to check the health of the components specified by the identified rules 204. Recovery module 312 can then roll back the storage platform to the known good state based on the result of the checks of the components specified by the identified rules 204 applicable to the failure. For example, if the result of the checks is that the components are in the proper states for rolling back the storage platform to the known good state, recovery module 312 can roll back the storage platform to the known good state and, once the storage platform is rolled back, perform recovery of the failed replication workflow (e.g., retry execution of the failed replication workflow). Otherwise, if the result of the checks is that the components are not in the proper states for rolling back the storage platform to the known good state, recovery module 312 does not attempt roll back of the storage platform to the known good state or recovery of the failed replication workflow. Rather, recovery module 312 can return the original failure. For example, recovery module 312 can return an indication of the original error associated with the replication workflow failure to a user that initiated the replication command request that caused processing of the replication workflow that failed.

In some embodiments, recovery module 312 can check to determine whether a failure of a replication workflow in the underlying storage platform is a failure of an unplanned failover. That is, recovery module 312 can check to determine whether a replication workflow failure that occurred in the underlying storage platform is of an unplanned failover. As used herein, the term "unplanned failover" refers to a failover that is initiated from a secondary (or "peer") site after an unanticipated outage at a primary site. Unlike a planned failover operation, an unplanned failover resumes production at the secondary site, but without remote mirroring until the primary site becomes operational and ready for a failback operation. In response to a determination that a failure of a replication workflow in the underlying storage platform is a failure of an unplanned failover, recovery module 312 can reattempt the unplanned failover by default since the state machine (e.g., the state machine implemented in an adapter embedded within the SDNAS) needed for performing the failover is already implemented in the underlying storage platform. In this case, recovery module 312 does not perform any health checks of components of the underlying data replication facility.

Figure 4:
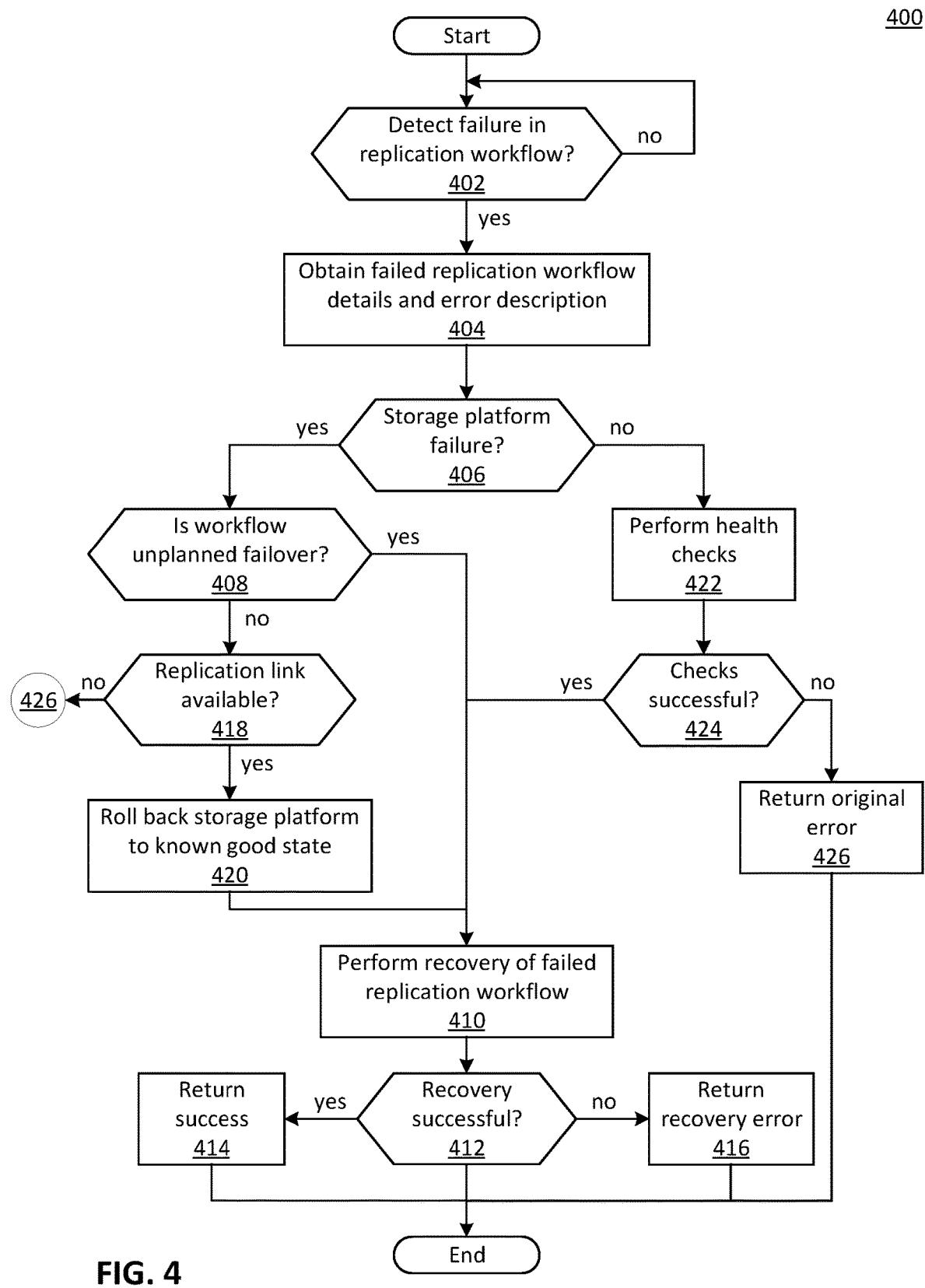
FIG. 4 is a flow diagram of an example process for detection and recovery of platform specific replication failures, in accordance with an embodiment of the present disclosure.

FIG. 4 is a flow diagram of an example process 400 for detection and recovery of platform specific replication failures, in accordance with an embodiment of the present disclosure. Illustrative process 400 may be implemented, for example, within SDNAS middleware 202 including other components of system 300 of FIG. 3. For the purposes of this discussion, it is assumed that a user uses a client device (e.g., client 302 of FIG. 3) to initiate a replication command request on storage system 304 (e.g., send storage system 304 a replication command request).

With reference to process 400 of FIG. 4, at 402, a check may be performed to determine whether a failure in a replication workflow is detected. For example, error detection module 310 of SDNAS middleware 202 may be monitoring a replication workflow execution on storage system 304 resulting from the replication command for a failure. If it is determined that a failure in the replication workflow is not detected, then the monitoring of the replication workflow for a failure may continue.

Otherwise, if, at 402, it is determined that a failure in the replication workflow is detected, then, at 404, the failed replication workflow details and error description may be obtained. The details may include an error code and a description of the error which caused the replication workflow to fail. For example, error detection module 310 may obtain the failed replication workflow details and error description from the SDNAS implementation (e.g., SDNAS middleware 202) or the underlying storage platform.

At 406, a check may be performed to determine whether the failure of the replication workflow occurred in the underlying storage platform. For example, the error code and/or the description of the error associated with the failure may be analyzed to determine whether the failure of the replication workflow occurred in the underlying storage platform.

If, at 406, it is determined that the failure of the replication workflow occurred in the underlying storage platform, then, at 408, a check may be performed to determine whether the failed replication workflow is an unplanned failover. For example, if the failure in the underlying storage platform is a failure of an unplanned failover, a check of the health of the data replication facility of the underlying storage platform need not be performed.

If, at 408, it is determined that the failed replication workflow is an unplanned failover, then, at 410, recovery of the failed replication workflow may be performed. For example, since the failed replication workflow is an unplanned failover, the unplanned failover that failed may be reattempted. The recovery of the failed replication workflow (i.e., the reattempted unplanned failover) may then be monitored for successful completion or a failure.

At 412, a determination may be made as to whether the recovery of the failed replication workflow is successful. If it is determined that the recovery of the failed replication workflow is successful (i.e., the reattempted unplanned failover is successful), then, at 414, an indication of successful completion of the replication workflow may be provided. For example, the indication of successful completion of the replication workflow may be returned in a response to the user that initiated the replication command request (e.g., the replication command request that caused processing of the replication workflow). Process 400 may then end.

Otherwise, if, at 412, it is determined that the recovery of the failed replication workflow is not successful (i.e., the reattempted unplanned failover is not successful), then, at 416, an indication of a failure of the recovery of the failed replication workflow may be provided. For example, an indication of a recovery error which caused the failed replication workflow recovery failure may be provided. Such indication, for example, may be returned in a response to the user that initiated the replication command request. Process 400 may then end.

Otherwise, if, at 408, it is determined that the failed replication workflow is not an unplanned failover, then, at 418, checks may be performed to determine whether the data replication facility of the underlying storage platform is available. For example, the checks may be to determine whether the link status of the data replication facility is in condition for rolling back the storage platform to a known good state. The checks that are to be performed may be specified in one or more predetermined rules (e.g., one or more rules 204) that are applicable to the failure of the replication workflow.

If, at 418, it is determined that the data replication facility of the underlying storage platform is not available, then, at 426, an indication of an original error associated with the failure of the replication workflow may be provided. For example, the indication of the original error associated with the failure of the replication workflow (e.g., an indication of the replication error which caused the replication workflow failure) may be returned in a response to the user that initiated the replication command request. Process 400 may then end.

Otherwise, if, at 418, it is determined that the data replication facility of the underlying storage platform is available, then, at 420, the storage platform may be rolled back to a known good state. The known good state for the storage platform may be specified in one or more predetermined rules (e.g., one or more rules 204) that are applicable to the failure of the replication workflow. For example, the known good state is a state of the storage platform for performing recovery of the failed replication workflow.

Once the storage platform is rolled back to the known good state, at 410, recovery of the failed replication workflow may be performed. For example, execution of the failed replication workflow may be retried. The recovery of the failed replication workflow may then be monitored for successful completion or a failure.

Operations 412, 414, and 416 may then be performed to return the results of the recovery of the failed replication workflow. For example, at 412, a determination may be made as to whether the recovery of the failed replication workflow is successful. If it is determined that the recovery of the failed replication workflow is successful, then, at 414, an indication of successful completion of the replication workflow may be provided. For example, the indication of successful completion of the replication workflow may be returned in a response to the user that initiated the replication command request (e.g., the replication command request that caused processing of the replication workflow). Process 400 may then end.

Otherwise, if, at 406, it is determined that the failure of the replication workflow did not occur in the underlying storage platform (e.g., the failure occurred in the SDNAS), then, at 422, health checks may be performed to validate the health of the platform. For example, health checks of various components of the SDNAS which are needed to perform the replication workflow may be performed to validate the health of the components (e.g., to confirm that the components are in the proper states for performing recovery of the failed replication workflow). The components of the SDNAS that are to be checked as well as the checks that are to be performed may be specified in one or more predetermined rules (e.g., one or more rules 204) that are applicable to the failure of the replication workflow.

If, at 424, it is determined that the health checks performed at 422 are successful (e.g., the components of the SDNAS specified in the one or more predetermined rules applicable to the failure of the replication workflow are in the proper states for performing recovery of the failed replication workflow), then, at 410, recovery of the failed replication workflow may be performed. For example, forward execution of the replication workflow from the detected failure (e.g., from the failed replication operation in the replication workflow) can be attempted. The recovery of the failed replication workflow may then be monitored for successful completion or a failure.

Operations 412, 414, and 416 may then be performed to return the results of the recovery of the failed replication workflow. For example, at 412, a determination may be made as to whether the recovery of the failed replication workflow is successful. If it is determined that the recovery of the failed replication workflow is successful, then, at 414, an indication of successful completion of the replication workflow may be provided. For example, the indication of successful completion of the replication workflow may be returned in a response to the user that initiated the replication command request (e.g., the replication command request that caused processing of the replication workflow). Process 400 may then end.

If, at 424, it is determined that the health checks performed at 422 are not successful (e.g., the components of the SDNAS specified in the one or more predetermined rules applicable to the failure of the replication workflow are not in the proper states for performing recovery of the failed replication workflow), then, at 426, an indication of an original error associated with the failure of the replication workflow may be provided. For example, the indication of the original error associated with the failure of the replication workflow (e.g., an indication of the replication error which caused the replication workflow failure) may be returned in a response to the user that initiated the replication command request. Process 400 may then end.

FIG. 5 is a block diagram illustrating selective components of an example computing device 500 in which various aspects of the disclosure may be implemented, in accordance with an embodiment of the present disclosure. For example, illustrative computing device 500 can perform all or part of the processes described herein. As shown, computing device 500 includes one or more processors 502, a volatile memory 504 (e.g., random access memory (RAM)), a non-volatile memory 506, a user interface (UI) 508, one or more communications interfaces 510, and a communications bus 512.

Non-volatile memory 506 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

User interface 508 may include a graphical user interface (GUI) 514 (e.g., a touchscreen, a display, etc.) and one or more input/output (I/O) devices 516 (e.g., a mouse, a keyboard, a microphone, one or more speakers, one or more cameras, one or more biometric scanners, one or more environmental sensors, and one or more accelerometers, etc.).

Non-volatile memory 506 stores an operating system 518, one or more applications 520, and data 522 such that, for example, computer instructions of operating system 518 and/or applications 520 are executed by processor(s) 502 out of volatile memory 504. In one example, computer instructions of operating system 518 and/or applications 520 are executed by processor(s) 502 out of volatile memory 504 to perform all or part of the processes described herein (e.g., processes illustrated and described with reference to FIGS. 1 through 4). In some embodiments, volatile memory 504 may include one or more types of RAM and/or a cache memory that may offer a faster response time than a main memory. Data may be entered using an input device of GUI 514 or received from I/O device(s) 516. Various elements of computing device 500 may communicate via communications bus 512.

The illustrated computing device 500 is shown merely as an illustrative client device or server and may be implemented by any computing or processing environment with any type of machine or set of machines that may have suitable hardware and/or software capable of operating as described herein.

Processor(s) 502 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

Processor 502 may be analog, digital, or mixed signal. In some embodiments, processor 502 may be one or more physical processors, or one or more virtual (e.g., remotely located or cloud computing environment) processors. A processor including multiple processor cores and/or multiple processors may provide functionality for parallel, simultaneous execution of instructions or for parallel, simultaneous execution of one instruction on more than one piece of data.

Communications interfaces 510 may include one or more interfaces to enable computing device 500 to access a computer network such as a Local Area Network (LAN), a Wide Area Network (WAN), a Personal Area Network (PAN), or the Internet through a variety of wired and/or wireless connections, including cellular connections.

In described embodiments, computing device 500 may execute an application on behalf of a user of a client device. For example, computing device 500 may execute one or more virtual machines managed by a hypervisor. Each virtual machine may provide an execution session within which applications execute on behalf of a user or a client device, such as a hosted desktop session. Computing device 500 may also execute a terminal services session to provide a hosted desktop environment. Computing device 500 may provide access to a remote computing environment including one or more applications, one or more desktop applications, and one or more desktop sessions in which one or more applications may execute.

In the foregoing detailed description, various features of embodiments are grouped together for the purpose of streamlining the disclosure. This method of disclosure is not to be interpreted as reflecting an intention that the claims require more features than are expressly recited. Rather, inventive aspects may lie in less than all features of each disclosed embodiment.

As will be further appreciated in light of this disclosure, with respect to the processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

Elements of different embodiments described herein may be combined to form other embodiments not specifically set forth above. Other embodiments not specifically described herein are also within the scope of the following claims.

Reference herein to "one embodiment" or "an embodiment" means that a particular feature, structure, or characteristic described in connection with the embodiment can be included in at least one embodiment of the claimed subject matter. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the words "exemplary" and "illustrative" are used herein to mean serving as an example, instance, or illustration. Any aspect or design described herein as "exemplary" or "illustrative" is not necessarily to be construed as preferred or advantageous over other aspects or designs. Rather, use of the words "exemplary" and "illustrative" is intended to present concepts in a concrete fashion.

In the description of the various embodiments, reference is made to the accompanying drawings identified above and which form a part hereof, and in which is shown by way of illustration various embodiments in which aspects of the concepts described herein may be practiced. It is to be understood that other embodiments may be utilized, and structural and functional modifications may be made without departing from the scope of the concepts described herein. It should thus be understood that various aspects of the concepts described herein may be implemented in embodiments other than those specifically described herein. It should also be appreciated that the concepts described herein are capable of being practiced or being carried out in ways which are different than those specifically described herein.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical examples to aid the reader in understanding the present disclosure, and are to be construed as being without limitation to such specifically recited examples and conditions. Although illustrative embodiments of the present disclosure have been described in detail, various changes, substitutions, and alterations could be made hereto without departing from the scope of the present disclosure. Accordingly, it is intended that the scope of the present disclosure be limited not by this detailed description, but rather by the claims appended hereto.

What is claimed is:

1. A method comprising:
   monitoring, by a computing device, a replication workflow execution on a storage system; and
   responsive to a detection of a failure of the replication workflow, by the computing device:
   determining whether the failure is in a Software Defined Network Attached Storage (SDNAS) or in an underlying storage array platform; and
   responsive to a determination that the failure is in the SDNAS:
   validating a health of the SDNAS for performing the replication workflow; and
   responsive to validating the health of the SDNAS, performing a recovery of the failed replication workflow that includes attempting forward execution of the replication workflow from a failed replication operation in the replication workflow.

2. The method of claim 1, wherein the validating a health of the SDNAS for performing the replication workflow includes checking one or more components of the SDNAS which are needed to perform the replication workflow.

3. The method of claim 1, further comprising, responsive to failing to validate the health of the SDNAS for performing the replication workflow, reporting an original error associated with the failure of the replication workflow in the SDNAS.

4. The method of claim 1, further comprising reporting a result of the recovery of the failed replication workflow.

5. The method of claim 1, wherein determining whether the failure is in the underlying storage array platform includes determining whether the failure is in a data replication facility of the underlying storage array platform.

6. The method of claim 1, further comprising:
   responsive to a determination that the failure is in the underlying storage array platform:
   determining whether the underlying storage array platform can be rolled back to a previously known good state for performing the replication workflow; and
   responsive to a determination that the underlying storage array platform can be rolled back to the previously known good state:
   performing a rollback of the underlying storage array platform to the previously known good state; and
   performing the recovery of the failed replication workflow.

7. The method of claim 6, wherein the determining whether the underlying storage array platform can be rolled back to the previously known good state includes determining whether a data replication facility of the underlying storage array platform is available.

8. The method of claim 6, further comprising, responsive to the determination that the failure is in the underlying storage array platform, responsive to a determination that the replication workflow is an unplanned failover, performing the recovery of the failed replication workflow without the rollback of the underlying storage array platform to the previously known good state.

9. The method of claim 7, further comprising, responsive to a determination that the underlying storage array platform cannot be rolled back to the previously known good state, reporting an original error associated with the failure of the replication workflow in the underlying storage array platform.

10. The method of claim 6, wherein the performing the recovery of the failed replication workflow responsive to the determination that the underlying storage array platform can be rolled back to the previously known good state includes retrying the failed replication workflow.

11. The method of claim 10, further comprising reporting a result of the retrying of the failed replication workflow.

12. A computing device comprising:
    one or more non-transitory machine-readable mediums configured to store instructions; and
    one or more processors configured to execute the instructions stored on the one or more non-transitory machine-readable mediums, wherein execution of the instructions causes the one or more processors to carry out a process comprising:
    monitoring a replication workflow execution on a storage system; and
    responsive to a detection of a failure of the replication workflow:
    determining whether the failure is in a Software Defined Network Attached Storage (SDNAS) or in an underlying storage array platform; and
    responsive to a determination that the failure is in the SDNAS:
    validating a health of the SDNAS for performing the replication workflow; and
    responsive to validating the health of the SDNAS, performing a recovery of the failed replication workflow that includes attempting forward execution of the replication workflow from a failed replication operation in the replication workflow.

13. The computing device of claim 12, wherein the validating a health of the SDNAS for performing the replication workflow includes checking one or more components of the SDNAS which are needed to perform the replication workflow.

14. The computing device of claim 12, wherein determining whether the failure is in the underlying storage array platform includes determining whether the failure is in a data replication facility of the underlying storage array platform.

15. The computing device of claim 12, wherein the process further comprises:
    responsive to a determination that the failure is in the underlying storage array platform:
    determining whether the underlying storage array platform can be rolled back to a previously known good state for performing the replication workflow; and responsive to a determination that the underlying storage array platform can be rolled back to the previously known good state:
  performing a rollback of the underlying storage array platform to the previously known good state; and
  performing the recovery of the failed replication workflow.

16. The computing device of claim 15, wherein the determining whether the underlying storage array platform can be rolled back to the previously known good state includes determining whether a data replication facility of the underlying storage array platform is available.

17. The computing device of claim 15, wherein the process further comprises, responsive to the determination that the failure is in the underlying storage array platform, responsive to a determination that the replication workflow is an unplanned failover, performing the recovery of the failed replication workflow without the rollback of the underlying storage array platform to the previously known good state.

18. A non-transitory machine-readable medium encoding instructions that when executed by one or more processors cause a process to be carried out, the process including:
  monitoring a replication workflow execution on a storage system; and
  responsive to a detection of a failure of the replication workflow:
    determining whether the failure is in a Software Defined Network Attached Storage (SDNAS) or in an underlying storage array platform;
    responsive to a determination that the failure is in the SDNAS:
      validating a health of the SDNAS for performing the replication workflow; and
      responsive to validating the health of the SDNAS, performing a recovery of the failed replication workflow; and
    responsive to a determination that the failure is in the underlying storage array platform:
      determining whether the underlying storage array platform can be rolled back to a previously known good state for performing the replication workflow; and
      responsive to a determination that the underlying storage array platform can be rolled back to the previously known good state:
        performing a rollback of the underlying storage array platform to the previously known good state; and
        performing the recovery of the failed replication workflow.

* * * * *